(12) United States Patent
Hui

(10) Patent No.: US 8,339,078 B2
(45) Date of Patent: Dec. 25, 2012

(54) APPARATUS AND METHOD FOR PROVIDING INFORMATION RELATING TO A MOTOR

(75) Inventor: Shu Yuen Ron Hui, Shatin (HK)

(73) Assignee: The City University of Hong Kong, Kowloon (HK)

( * ) Notice: Subject to any disclaimer, the term of this patent is extended or adjusted under 35 U.S.C. 154(b) by 601 days.

(21) Appl. No.: 12/501,645

(22) Filed: Jul. 13, 2009

(65) Prior Publication Data

US 2011/0006714 A1 Jan. 13, 2011

(51) Int. Cl.
*H02P 27/04* (2006.01)

(52) U.S. Cl. ............... 318/400.26; 318/400.32; 318/615; 318/667; 318/807; 318/810; 324/160; 324/177; 324/163; 324/207.11; 324/207.12; 702/141; 702/142

(58) Field of Classification Search ............. 318/400.26, 318/400.32, 615, 667, 810, 807; 324/160, 324/177, 163, 207.11, 207.12; 361/239, 361/240; 702/141, 142

See application file for complete search history.

(56) References Cited

U.S. PATENT DOCUMENTS

| | | | |
|---|---|---|---|
| 4,527,101 A | | 7/1985 | Zavis et al. |
| 5,448,149 A | * | 9/1995 | Ehsani et al. ................. 318/701 |
| 6,172,498 B1 | * | 1/2001 | Schmidt et al. .......... 324/207.12 |
| 6,879,129 B2 | * | 4/2005 | Tazawa et al. ................. 318/727 |
| 7,468,595 B2 | * | 12/2008 | Lee et al. ....................... 318/802 |
| 7,742,321 B2 | * | 6/2010 | Komulainen et al. ........... 363/37 |
| 2002/0140395 A1 | * | 10/2002 | Tazawa et al. ................. 318/727 |
| 2007/0296371 A1 | * | 12/2007 | Aoki .............................. 318/700 |
| 2010/0277149 A1 | * | 11/2010 | Furutani et al. ............... 323/282 |
| 2011/0057593 A1 | * | 3/2011 | Williams et al. .......... 318/400.26 |

OTHER PUBLICATIONS

Shi, et al.: *"Adaptive Controller Design for a Sensorless IPMSM Drive System with a Maximum Torque Control"* IEEE Proc. Electr. Power Appl., vol. 153, No. 6, Nov. 2006.

Shi, et al.: *"Position Control of an Interior Permanent-Magnet Synchronous Motor Without Using a Shaft Position Senso"* IEEE Transaction on Indsutrial Electronics, vol. 54, No. 4, Aug. 2007.

* cited by examiner

*Primary Examiner* — Rita Leykin

(57) ABSTRACT

This invention relates to an apparatus and method for deriving speed and position information for an electric motor. Apparatus for and a method of controlling a motor 100 are also disclosed. The apparatus for providing information relating to the operation of an electrical motor 100 comprises a sampler 50, 51 for sampling the instantaneous motor current $i_s$ and a processor 160 for determining the instantaneous rate of change of the motor current and providing information about the motion or position of said motor based on said instantaneous rate of change of the motor current. In this way speed and position information can be provided, at low speeds, and without using a speed sensor.

18 Claims, 6 Drawing Sheets

APPARATUS AND METHOD FOR PROVIDING INFORMATION RELATING TO A MOTOR

FIELD OF THE INVENTION

This invention relates to methods and apparatus for providing information relating to operation of a motor and electronic control of motor drives. In particular, methods and apparatus that do not require the use of speed and position sensors.

BACKGROUND OF THE INVENTION

Most electrical motors are driven by power electronic circuits such as power inverters. Modern electronic motor drives require accurate information of motor speed for control purposes. Traditionally, speed sensors are mounted on the motor shaft so as to provide speed information for control purposes. However, the use of speed sensors not only increases the cost of the drive system, it also reduces the reliability of the motor drive system. In addition, the extra requirements for a shaft extension and mounting arrangement of the speed sensor make it unattractive to use speed sensors. Reliability of speed sensors is an issue particularly in hostile working environments where wide temperature fluctuations, mechanical vibrations and dust are factors affecting the lifetime of the speed sensors.

In the last decade, much research effort has been devoted to control methods for electronic motor drives that do not require the use of speed sensors. Some methods involve the use of flux detection coils inside the motors, at the expense of costs and complexity. However, none of the existing speed sensorless methods can work at zero speed. For some so-called speed sensorless methods a common way to overcome the zero-speed limitation is to energize the motor so as to kick start the speed to become non-zero before the speed sensorless method becomes effective.

PRIOR ART

Prior art speed estimation methods may be summarized as:
1. Slip calculation
2. Direct synthesis from state equations
3. Model referencing adaptive system (MRAS)
4. Speed adaptive flux observer (Luenberger observer)
5. Extended Kalman filter (EKF)
6. Slot harmonics
7. Injection of auxiliary signal on salient rotor Two recent papers published by J. L. Shi, T. H. Liu and Y. C. Chang ["Position control of an interior permanent-magnetic synchronous motor without using a shaft position sensor", IEEE Transactions on Industrial Electronics, Vol. 54, No. 4, August 2007, pp. 1989-2000 and "Adaptive controller design for a sensorless IPMSM drive system with a maximum torque control", IEE Proceedings on Electric Power Applications, Vol. 153, No. 6, November 2006, pp 823-833] use the slope of the "sinusoidal" stator currents at the freewheeling state of the inverter to estimate the "position" of the rotor without a position sensor.

There are two common features among the methods mentioned above:
1. The motor speed is expressed as a function of 'sinusoidal' variables such as voltage, current and flux. The normal analysis is based on a d-q transformation (or $\alpha$-$\beta$ transformation) that converts the 3-phase variables into the d-q (or $\alpha$-$\beta$) axes. All voltage and current variables are "sinusoidal" in this 3-axis to 2-axis transformation. Such use of "sinusoidal voltage" is in contrast with the actual pulse-width-modulated (PWM) voltage that actually drives the motor. Even though the practical stator current waveforms consist of switching ripples due to the PWM switching of the power inverter, these current ripples (that contain the instantaneous information) are ignored. In the prior art techniques the current ripples are filtered out.
2. The prior art techniques cannot work properly at zero speed and, in some cases, speeds less than 5% of the rated speed of the motor.

SUMMARY OF THE INVENTION

According to a first aspect of the present invention there is provided an apparatus for providing information relating to the operation of an electrical motor; comprising a sampler for sampling the instantaneous motor current $i_s$ and a processor for determining the instantaneous rate of change of the motor current and providing information about the motion or position of said motor based on said instantaneous rate of change of the motor current. The motion or position information may be the speed of the motor, the position of the rotor or direction of rotation of the rotor.

The instantaneous rate of change of the motor current is calculated from samples of the instantaneous motor current. The instantaneous motor current is the actual motor current which is delivered to the motor. It may be sampled by use of a hall effect sensor or by other means.

The apparatus preferably comprises an inverter for driving the motor (e.g. a PWM inverter). The inverter is capable of switching between a plurality of switching states and provides a current for driving the motor. Preferably the inverter converts a DC voltage to an AC voltage. The inverter may be arranged to produce a motor current, approximating an ideal waveform (e.g. a sinusoidal wave or a trapezoidal wave). Typically the ideal waveform will have a frequency much lower than the switching frequency of the inverter e.g. the inverter frequency is at least 50, or at least 100 times faster. The motor current will often have peaks and troughs above and below said ideal waveform; said peaks and troughs being caused by switching of the inverter. These peaks and troughs contain valuable information and the processor takes them into account when calculating the motion or position information.

Preferably the apparatus is arranged so that the processor determines the instantaneous rate of change of the motor current based on instantaneous motor current $i_s$ samples which are not filtered, or which are filtered by a filter which retains peaks and troughs caused by switching of the inverter. The filter may be a digital filter which is implemented by a processor (e.g. the controller of the motor). The filter does not produce a smooth, filtered current (e.g. in the form of a sinusoidal wave), but lets pass switching ripples due to switching of the inverter. It may filter out current spikes which are considerably higher than expected due to switching ripples (i.e. switching ripples are retained and noise spikes filtered out). In this way valuable information is retained but background noise may be filtered out.

Preferably the sampler has a sampling rate with a frequency greater than or equal to a switching frequency of the inverter. Preferably much greater, e.g. 10 at least times great than the inverter switching frequency. The processor takes into account not only the instantaneous rate of change of the motor current, but also other variables and constants.; for example any or all of the known voltage in each inverter switching state, the motor constant, the motor's electrical resistance, the motor inductance, or any combination thereof.

There may be a plurality of samplers arranged for sampling the instantaneous motor current in a plurality of phases. For example two separate sampling devices may be used to sample two of the phases and output to the processor. The processor calculates the motor position or motion information based on measurements of the instantaneous current in said at least two phases. The processor may calculate the instantaneous current in a third phase from the first two phases and the instantaneous rate of change of the current in the third phase also. In this way information from three phases may be utilized with the minimum of hardware. Furthermore, if there is an unexpectedly large difference between the samples in the two phases, or if one or more samples are significantly different to what was expected, based on samples in previous periods, they may be discarded. In this way noise can be reduced.

The processor may calculate the motor speed for a plurality of current phases and estimate the actual motor speed based on the average of the motor speeds for each phase. The processor may calculate stepped down versions of the back electromotive forces for each phase. These stepped down versions of the back electromotive forces for each phase may be used to calculate the motor speed. The position of the rotor and/or the direction of rotation of the rotor may be estimated by comparing said stepped down versions of the back electromotive forces; in particular comparison of their relative values.

The processor may be arranged to calculate the position or motion information based on an artificial motor constant which is lower than the actual motor constant of the motor. This enables more information to be collected, especially at low or zero motor speeds. For example, where a stepped down version of the back emf is used, typically the stepped down version is a function with the motor constant in the denominator. Therefore by using an artificially low motor constant, more information can be extracted.

A second aspect of the present invention provides a method of determining information relating to operation of a motor comprising the steps of
 a) sampling a plurality of instantaneous motor current values
 b) determining the instantaneous rate of change of the motor current based on said current values
 c) calculating information about the motion or position of said motor based on said instantaneous rate of change of the motor current.

The step of sampling preferably comprises taking a plurality of samples of actual motor current above or below an ideal waveform for the motor current. The method may comprise the step of switching an inverter between a plurality of switching states to provide current to the motor. The instantaneous motor current is preferably sampled at a frequency equal to or greater than the frequency of the inverter. Preferably the sampling frequency is at least 10 times greater than the inverter frequency.

The motor position and/or motion information may be calculated based on not only the instantaneous rate of change of the motor current, but also other variables and constants. For example, any or all of the known voltage in each inverter switching state, the motor constant, the motor's electrical resistance, the motor inductance, or any combination thereof may be used in the calculating step.

The motor speed may be calculated for a plurality of current phases. The actual motor speed may be estimated based on the average of the motor speeds for each phase. Instantaneous current values may be sampled for a plurality of phases of current and and the motion or position information determined based on information from a plurality of phases of the current. Stepped down versions of the back electromotive forces may be calculated for each phase. The speed of the motor may be calculated based on said stepped down versions of the back electromotive forces for a plurality of phases. The position of and direction of rotation of the rotor may be estimated by comparing the values of the stepped down versions of the back electromotive forces for a plurality of phases.

A third aspect of the present invention provides a method of controlling a motor based on information relating to the position or motion of the motor, comprising the steps of determining position or motion information of the motor in accordance with the second aspect of the present invention and controlling the motor on the basis of said information.

A fourth aspect of the present invention provides an apparatus for controlling a motor comprising the apparatus of the first aspect of the invention. The apparatus may be configured or programmed to operate in accordance with the second or third aspects.

The features of any of the above aspects of the invention may be combined together.

BRIEF DESCRIPTION OF THE DRAWINGS

Some embodiments of the invention will now be described with reference to the accompanying drawings, in which.

DETAILED DESCRIPTION OF PREFERRED EMBODIMENTS

The basic concept underlying embodiments of the invention is first illustrated with a per-phase equivalent circuit of a motor. The application of the concept to a multiphase motor will be described later.

Figure 1A:
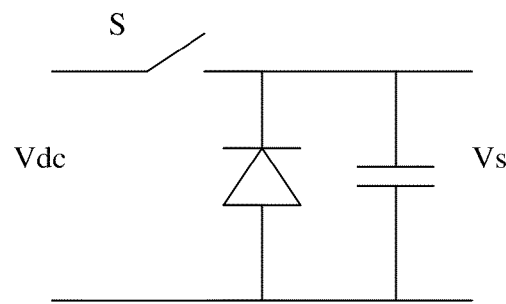
FIGS. 1(a)-(c) illustrate typical circuits used for driving electrical motors.

FIG. 1(a) shows a dc-dc chopper circuit that is commonly used for driving dc motors. When the switch (S) is turned on, the output voltage (Vs) for driving the motor is Vdc. When the switch is turned off, the motor current will flow through the diode so that the converter output voltage is zero. Thus, the output voltage of the chopper circuit is:

$$Vs = q \cdot Vdc \qquad (1)$$

where q=[0,1]

Figure 1B:
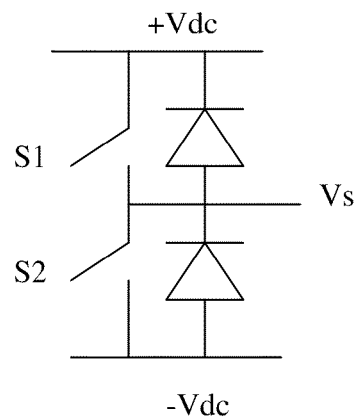

FIG. 1(b) shows one power inverter leg. S1 and S2 are switched in a complimentary manner. That is, when S1 is turned on, S2 is turned off, and vice versa. The output voltage of this inverter leg can be expressed as:

For 2-level power inverter, $$Vs = qVdc \qquad (2)$$

where q=[−1, +1]

Figure 1C:
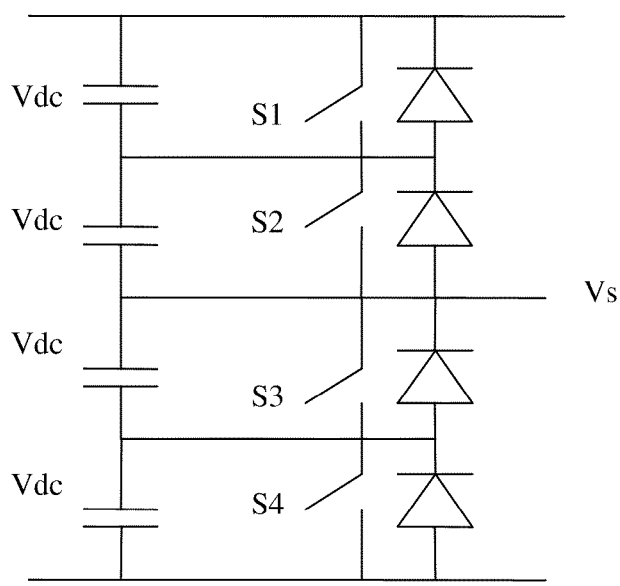

A 3-level inverter is shown in FIG. 1(c). With appropriate control of the four switches S1 to S4, the output voltage can be:

For 3-level power inverter, $$Vs = q.Vdc \quad (3)$$

where q=[−1, 0, +1]

In general, for a M-level inverter, $q=[-(M-1)/2, \ldots, -1, 0, +1, \ldots, +(M-1)/2]$ (4)

Figure 2:
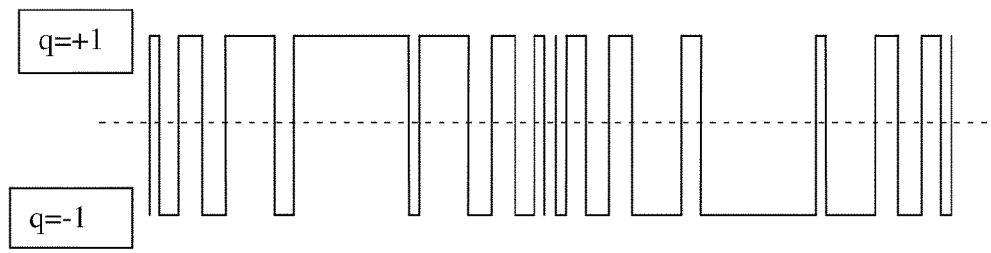
FIG. 2 illustrates a typical switching cycle.

FIG. 2 shows the typical changes of q with time for a 2-level power inverter over one cycle.

Figure 3:
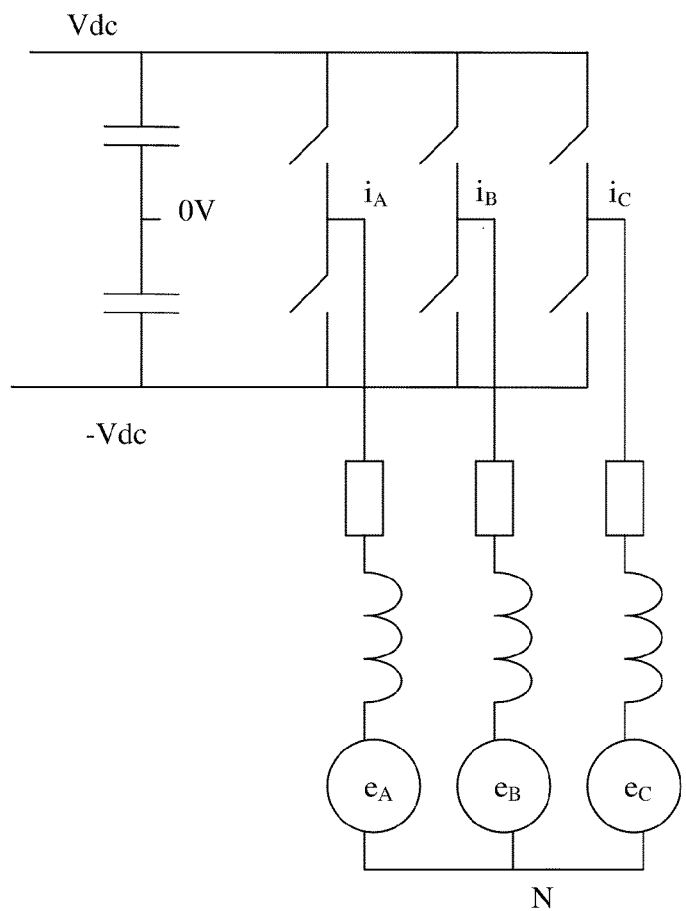
FIG. 3 is a simplified schematic of a 2-level power inverter driving a 3-phase motor.
Figure 4:
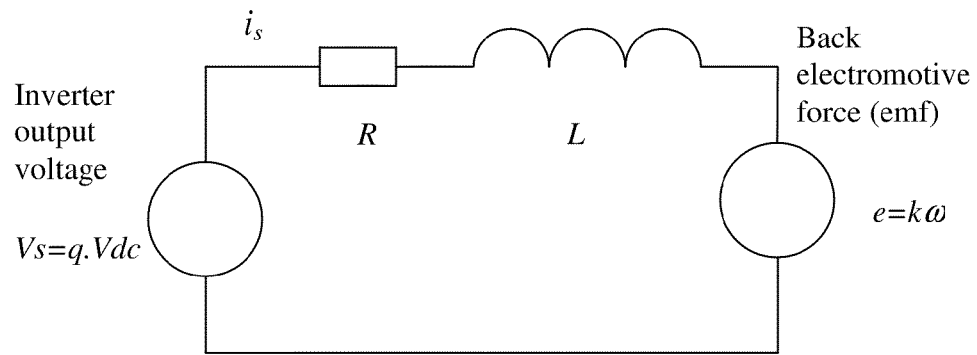
FIG. 4 shows schematically a simplified inverter driven motor drive (per-phase equivalent model)

FIG. 3 shows a schematic of a 2-level power inverter driving a 3-phase motor. In general, the equivalent circuit of a power inverter driven (ac or dc) motor can be simplified to a per-phase model as shown in FIG. 4. For an ac motor, input voltage Vs is modeled as an ac voltage source with discrete voltage levels generated by the power inverter circuit. For a dc motor drive, Vs is switched at Vdc or 0V. R is the winding resistance, L is the inductance of the motor winding, k is a motor constant and ω is the motor speed. The back electromotive force (emf) is proportional to the speed of the motor. The back emf is represented as an ac voltage source for an ac motor and a dc voltage source for a dc motor.

The circuit equation can be expressed as:

$$V_s = Ri_S + L\frac{di_S}{dt} + k\omega \quad (5a)$$

In general, $Vs = q \cdot Vdc$ (5b)

where q is an integer that changes in real-time according to the switching strategy. For an ac motor drive, a pulse-width-modulation (PWM) method that generates a good fundamental ac voltage (i.e. a voltage waveform with a good sinusoidal voltage content) is usually adopted as the switching strategy. The instantaneous value of q is determined by the switching control of the power inverter which is therefore known in the controller.

Unlike the traditional approach that uses filtered sinusoidal variables in (5a) to estimate the speed, preferred embodiments of the present invention use the instantaneous PWM voltage waveform for Vs. This exact PWM voltage waveform includes the full harmonic content of the applied voltage to the motor. Consequently, the proposed method can work well at low speeds because the instantaneous information that is particularly important at low speed is not filtered away.

Figure 5:
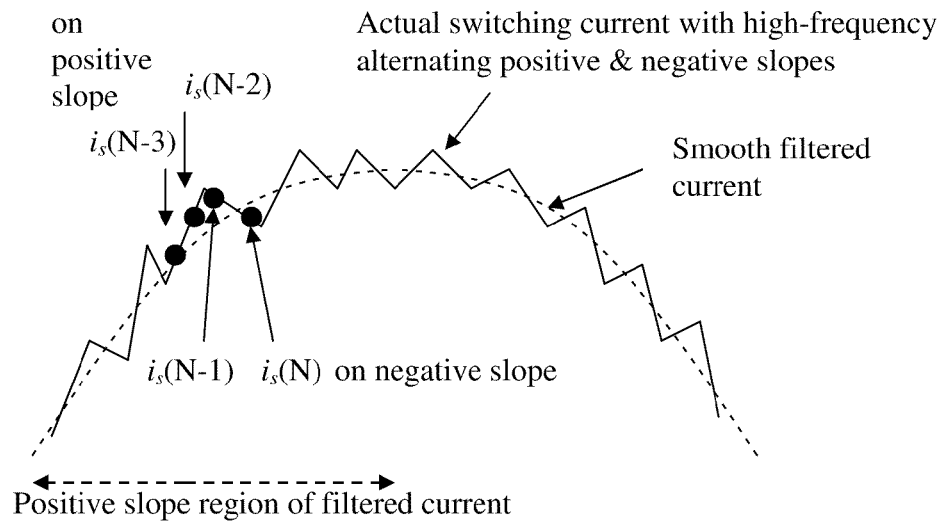
FIG. 5 illustrates the instantaneous sampling of stator current according to an embodiment of the invention.

It is important to understand the term "instantaneous rate of change of the motor current"

$$\frac{di_S}{dt}\bigg|^*$$

in this description. Generally, for most of the ac motors driven by power inverters, the power inverter is switched at high frequency (typically a few kilo-Hertz to even several tens of kilo-Hertz). FIG. 5 shows part of an ideal sinusoidal current waveform and a typical switched current waveform. In practice, the actual stator current is switched at high frequency and the current waveform ramps up and down to follow the ideal sinusoidal waveform. In FIG. 5, the solid switching current represents an actual stator current in a motor while the smooth dotted current waveform represents the filtered current. In many existing control schemes, the current ripple is filtered so that a good sinusoidal current signal is obtained. The slope of the current ($di_s/dt$) used in many existing motor control methods is the slope of the filtered current. However, such filtering techniques have the effect of eliminating a lot of useful instantaneous information that is needed in the speed estimation.

In preferred embodiments of this invention, the sampled $di_s/dt$ is the instantaneous slope of the actual switching current during each inverter switching state. For example, in the first 90 degrees of the smooth filtered sinusoidal waveform, the slope of the filtered or ideal sinusoidal waveform is "always positive". But if we determine the slope of the actual current waveform at each inverter switching state, the slope can be "positive or negative".

The sampled current points in FIG. 5 illustrate this important concept. In an inverter switching state where the stator current ramps up, current samples $i_s(N-3)$ and $i_s(N-2)$ are obtained with a sampling period of Δt. In this inverter switching state, $$\frac{di_S}{dt}\bigg|^* = \frac{i_S(N-2) - i_S(n-3)}{\Delta t} > 0$$

The slope is positive.

In the next switching state, the current ramps down, $$\frac{di_S}{dt}\bigg|^* = \frac{i_S(N) - i_S(n-1)}{\Delta t} < 0$$

The slope is negative.

For each PWM inverter switching state, the exact value of the inverter output voltage level Vs=qVdc is known. For each input inverter voltage level, sampling the instantaneous values of motor current $i_s$, allows the $di_s/dt$ value to be determined. Then equation (5a) can be re-arranged in a continuous form as:

$$\omega = \frac{1}{k}\left\{q^*Vdc - Ri_S\big|^* - L\frac{di_S}{dt}\bigg|^*\right\} \quad (6)$$

In equation (6), the variables with * are known variables within each switching instant of the power inverter. There is no restriction on the value of the motor speed. Therefore, equation (6) shows that the instantaneous motor speed ω can be determined from (i) the motor parameters R, L and k;

(ii) the known instantaneous inverter switching state q*Vdc and (iii) the instantaneous sampled motor current $i_s|^*$ and (iv) the corresponding instantaneous rate of change of motor current $$\frac{di_S}{dt}\bigg|^*.$$

Equation (6) can also be expressed in a discrete form if it is implemented in a digital controller. Assuming the motor current is sampled regularly at a frequency $f_s$ (with a period of $\Delta t=1/f$). For the $N^{th}$ sample, equation (6) can be expressed in a discrete form as:

$$\omega(N) = \frac{1}{k}\left[q(N)Vdc - Ri_S(N) - L\left(\frac{\Delta i_S}{\Delta t}\right)\right] \quad (7)$$

where $\Delta i_S = i_S(N) - i_S(N-1)$ \quad (8)

Equation (7) shows the basic concept of the speed estimation of the motor in a discrete form. Of course, various forms of digital filtering techniques can be employed to modify equation (7) in order to reduce the sampling noise for the digital controller. However, any noise filtering by the digital filter does not remove the current ripples, above and below the ideal waveform, caused by the inverter switching.

Assuming a balanced system, a 3-phase model of an ac motor with sinusoidal back electromotive force (emf) can be expressed as:

$$\overline{V}_{ABCS} = \overline{R}_S \overline{i}_{ABCS} + \frac{d\overline{\lambda}_{ABCS}}{dt} \quad (9)$$

where $$\overline{V}_{ABCS} = \begin{bmatrix} V_A \\ V_B \\ V_C \end{bmatrix}, \overline{R}_S = \begin{bmatrix} R & 0 & 0 \\ 0 & R & 0 \\ 0 & 0 & R \end{bmatrix},$$

$$\overline{\lambda} = \overline{L}_S \overline{i}_{ABCS} + \overline{\lambda}_m, \overline{L}_S = \begin{bmatrix} L_S & L_M & L_M \\ L_M & L_S & L_M \\ L_M & L_M & L_S \end{bmatrix},$$

$$\overline{\lambda}_m = \begin{bmatrix} k\sin(\omega_e t - \theta_o) \\ k\sin(\omega_e t - \theta_o - 2\pi/3) \\ k\sin(\omega_e t - \theta_o + 2\pi/3) \end{bmatrix} = \begin{bmatrix} k\sin(\theta_e) \\ k\sin(\theta_e - 2\pi/3) \\ k\sin(\theta_e + 2\pi/3) \end{bmatrix},$$

$$\theta_e = \left(\frac{P}{2}\right)\theta_r$$

and so $\omega_e = \left(\frac{P}{2}\right)\omega_m$

Here,
$\overline{\lambda}$ is the total flux linkage,
$\overline{\lambda}_m$ is the flux linkages established by the permanent magnet as viewed by the stator windings,
$\theta_e$=electrical angle
$\theta_r$=mechanical angle
$\theta_o$=initial angle
P=number of poles
$L_S$=self-inductance of stator winding
$L_M$=mutual inductance between two stator windings
$\omega_e$=electrical rotor angular speed
$\omega_m$=mechanical rotor angular speed Assuming that the inductance terms are linear, this 3-phase motor model can be re-arranged as:

$$\begin{bmatrix} v_A \\ v_B \\ v_C \end{bmatrix} = \begin{bmatrix} R & 0 & 0 \\ 0 & R & 0 \\ 0 & 0 & R \end{bmatrix}\begin{bmatrix} i_A \\ i_B \\ i_C \end{bmatrix} + \begin{bmatrix} L_S & L_M & L_M \\ L_M & L_S & L_M \\ L_M & L_M & L_S \end{bmatrix}\begin{bmatrix} \frac{di_A}{dt} \\ \frac{di_B}{dt} \\ \frac{di_C}{dt} \end{bmatrix} + \quad (10)$$

$$k\left(\frac{P}{2}\right)\omega_m\begin{bmatrix} \cos(\omega_e t - \theta_o) \\ \cos(\omega_e t - \theta_o - 2\pi/3) \\ \cos(\omega_e t - \theta_o + 2\pi/3) \end{bmatrix}$$

where $v_X$ refers to the instantaneous inverter voltage level of phase-X, $i_X$ refers to the instantaneous motor current of phase-X, R is the resistance of the phase winding, Ls is the self-inductance of the stator windings, $L_M$ is the mutual inductance between two stator windings and $\theta$ is the initial angle between the rotor flux and stator flux.

For a star-connected motor as shown in FIG. 3, it can be seen that $$i_A + i_B + i_C = 0 \quad (11)$$

and therefore $\frac{di_A}{dt} + \frac{di_B}{dt} + \frac{di_C}{dt} = 0$ \quad (12)

Equations (11) and (12) indicates that, for a star-connected 3-phase load, two current sensors are sufficient to get all instantaneous information of the 3 phase currents and the three rates of change of current. For example, measuring $i_A$ and $i_B$ allows one to determine $i_C$. Similarly, $di_C/dt$ can be determined from the negative value of the sum of $di_A/dt$ and $di_B/dt$.

For Phase-A, the continuous equation is:

$$v_A = Ri_A + L_S\frac{di_A}{dt} + L_M\left(\frac{di_B}{dt} + \frac{di_C}{dt}\right) + k\left(\frac{P}{2}\right)\omega_A\cos(\omega_e t - \theta) \quad (13)$$

Therefore, the estimated mechanical rotor speed $\omega_A$ determined from Phase-A is:

$$\omega_A = \frac{1}{k(P/2)\cos(\omega_e t - \theta_o)} \quad (14a)$$

$$\left\{q_A Vdc - Ri_A\big|^* - L_S\frac{di_A}{dt}\bigg|^* - L_M\left(\frac{di_B}{dt}\bigg|^* + \frac{di_C}{dt}\bigg|^*\right)\right\}$$

where * denotes the sampled values used in real-time estimation of motor speed.

Similarly, for Phase-B and Phase-C, the continuous equations are:

$$\omega_B = \frac{1}{k(P/2)\cos(\omega_e t - \theta_o - 2\pi/3)} \quad (14b)$$

$$\left\{q_B Vdc - Ri_B\big|^* - L_S\frac{di_B}{dt}\bigg|^* - L_M\left(\frac{di_A}{dt}\bigg|^* + \frac{di_C}{dt}\bigg|^*\right)\right\}$$

$$\omega_C = \frac{1}{k(P/2)\cos(\omega_e t - \theta_o + 2\pi/3)} \quad (14c)$$

$$\left\{q_C Vdc - Ri_C\big|^* - L_S\frac{di_C}{dt}\bigg|^* - L_M\left(\frac{di_A}{dt}\bigg|^* + \frac{di_B}{dt}\bigg|^*\right)\right\}$$

To turn the 3 continuous equations (14a), (14b) and (14c) into the discrete forms, one can put $$i_X\big|^* = i_X(N) \text{ and } \frac{di_X}{dt}\bigg|^* = \frac{i_X(N) - i_X(N-1)}{\Delta t}$$

where subscript X refers to the phase of the system.

Several important points should be noted about equations (14a), (14b) and (14c):

(i) Theoretically, $\omega_A$, $\omega_B$ and $\omega_C$ should be identical. Practically, they may not be the same due to measurement or computing errors. The average of these estimated speed values will lead to good estimation of the motor speed.

(ii) These equations involved a division operation of a cosine function which can have zero instantaneous value. However, for a three-phase system, these 3 cosine functions are 120 electrical degrees apart. At any sampling instant, it is impossible to have more than one cosine function that has zero instantaneous value.

(iii) If none of the 3 cosine functions is zero, then the 3 estimated speed values can be derived and they can be used to check against each other for accuracy. If they are close enough, then their average value can be used as a good estimation of motor speed. If one of them is very different from the other two, the large difference may be due to measurement noise or error. That inconsistent value can be discarded, while the average of the two consistent values can be used for motor speed estimation.

(iv) If one of the 3 cosine functions is zero, then that speed equation can be ignored for that sampling period. The average of the other two speed estimated values can be used as a good motor speed estimation.

(v) There remains an issue with the unknown initial angle $\theta_o$.

To overcome the problem of cosine function being equal to zero, equations 14a-14c and can expressed as:

$$y_A = \omega_A \cos(\omega_e t - \theta_o) \tag{15a}$$
$$= \frac{2}{kP}\left\{q_A Vdc - Ri_A\bigg|^* - L_S\frac{di_A}{dt}\bigg|^* - L_M\left(\frac{di_B}{dt}\bigg|^* + \frac{di_C}{dt}\bigg|^*\right)\right\}$$

$$y_B = \omega_B \cos(\omega_e t - \theta_o - 2\pi/3) \tag{15b}$$
$$= \frac{2}{kP}\left\{q_B Vdc - Ri_B\bigg|^* - L_S\frac{di_B}{dt}\bigg|^* - L_M\left(\frac{di_A}{dt}\bigg|^* + \frac{di_C}{dt}\bigg|^*\right)\right\}$$

$$y_C = \omega_C \cos(\omega_e t - \theta_o + 2\pi/3) \tag{15c}$$
$$= \frac{2}{kP}\left\{q_C Vdc - Ri_C\bigg|^* - L_S\frac{di_C}{dt}\bigg|^* - L_M\left(\frac{di_A}{dt}\bigg|^* + \frac{di_B}{dt}\bigg|^*\right)\right\}$$

Comparing equation (13) and (15), $y_A$, $y_B$ and $y_C$ are essentially the stepped-down versions of the 3-phase back emfs. In these re-arranged formats, the estimated speed values are equal to the "peak values" of the cosine functions generated in equations (15a), (15b) and (15c). There is no need to calculate the angle $\theta_o$. However, the drawback of this approach is that when the speed is low, it may take some time for the controller to know the peak values of the cosine functions (i.e. the speed).

Without loss of generality, the method for instantaneous speed estimation based on the instantaneous sampled di/dt of the stator currents is illustrated in a motor with sinusoidal back emf. In principle, it can be extended to other types of motors as long as the waveforms of the back emf are known. The invention here can eliminate not only the speed sensor but also the position sensor because the initial angle $\theta_o$ can also be eliminated.

The mechanical rotor speed $\omega_m$ can be obtained by using the relationships that:

$$\cos^2(X) + \cos^2\left(X + \frac{2\pi}{3}\right) + \cos^2\left(X - \frac{2\pi}{3}\right) = 1.5 \tag{16}$$

and $$\omega_m = \omega_A = \omega_B = \omega_C \tag{17}$$

At any sampling instant, the "calculated" values $y_A$, $y_B$ and $y_C$ obtained from equations (15a), (15b) and (15c) are $$y_A = \omega_A^* = \omega_m \cos(\omega_e t - \theta_o) \tag{18a}$$

$$y_B = \omega_B^* = \omega_m \cos\left(\omega_e t - \theta_o - \frac{2\pi}{3}\right) \tag{18b}$$

$$y_C = \omega_C^* = \omega_m \cos\left(\omega_e t - \theta_o + \frac{2\pi}{3}\right) \tag{18c}$$

Since $(\omega_A^*)^2 + (\omega_B^*)^2 + (\omega_C^*)^2 = 1.5\omega_m^2$ (19)

Then, the estimated speed can be obtained from the following equation:

$$\omega_m = \sqrt{\frac{(\omega_A^*)^2 + (\omega_B^*)^2 + (\omega_C^*)^2}{1.5}} \tag{20}$$
$$= 0.816\sqrt{(\omega_A^*)^2 + (\omega_B^*)^2 + (\omega_C^*)^2}$$

Equation (20) can be used to determine the speed of the motor. The direction of the motor can be checked from the sequence of sampled values of $\omega_A^*$, $\omega_B^*$ and $\omega_C^*$ because they represent a 3-phase system with 120 degrees apart.

The direction of the rotation can be determined from the sequence of yA, yB and yC (i.e. stepped-down versions of the three back emfs) from equations (15a), (15b) and (15c) respectively.

At very low speeds (e.g. less than 5% of the rated speed), $y_A$, $y_B$ and $y_C$ are very small values. In order to improve the accuracy in a digital implementation that has limited resolutions, the motor constant k in equations (15a), (15b) and (15c) can be artificially reduced to a lower value so as to amplify $y_A$, $y_B$ and $y_C$ at the low speed region. In this way, the resolution of $y_A$, $y_B$ and $y_C$ can be improved even at low speeds.

Note that whether $\omega_m > 0$ or $\omega_m < 0$ cannot be determined by the measurements at a given instant of time without checking the sequences of $y_a$, $y_b$ and $y_c$. However if we have two measurements relatively close in time, then the direction of rotation can be determined, e.g. if $\theta_c$ is increasing over two successive measurements then we must have $\omega_m > 0$ (else $\omega_m < 0$).

Figure 6:
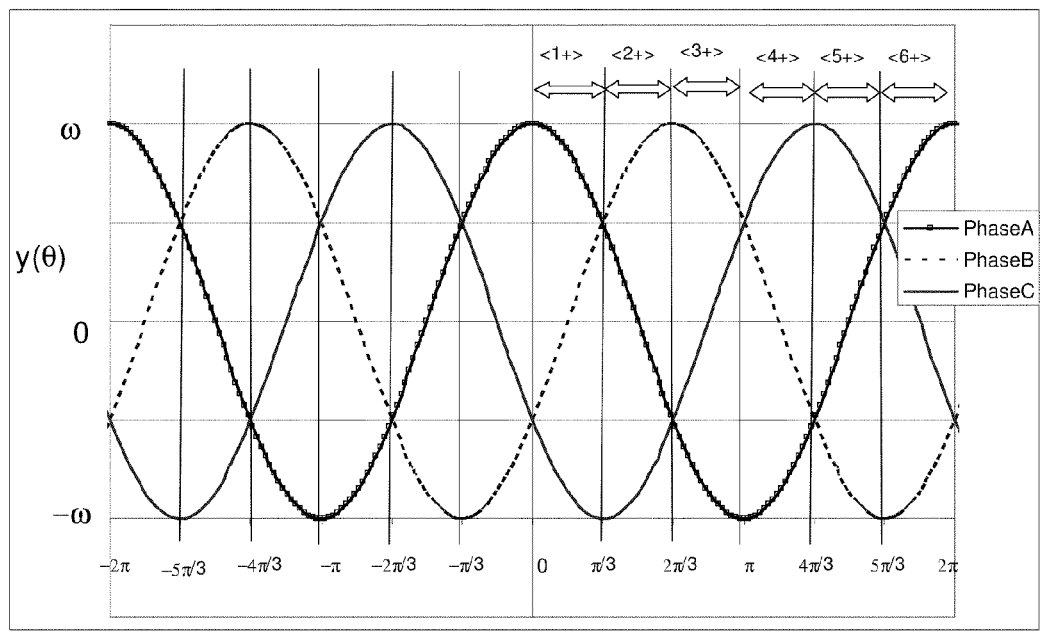
FIG. 6 is a graph showing an example of the variation of stepped down back emf functions with rotor angle.

The variations of y with respect to $\theta_e$ are plotted in FIG. 6. The function $\cos^{-1}(\ )$ is in effect being used to determine the rotor position from the measurements. Note that $\phi = \cos^{-1}(x)$ for $-1 \leq x \leq 1$ is unique only in the range $-\pi/2 < \phi < \pi/2$ and numerically it is more robust to compute it away from the extreme values of $\phi$. As depicted in the graph, for any given angle, one of the signals ($y_a$, $y_b$, $y_c$) is in the middle range and is better suited for the computations. Table 1 summarizes the computation for the rotor position in the 6 regions within one cycle.

TABLE 1

Calculation of electrical rotor angle from the signals ($y_a$, $y_b$, $y_c$)

| | | | |
|---|---|---|---|
| <1+> | $y_a > y_b > y_c$ | $\theta_e = (2\pi/3) - \cos^{-1}(y_b/|\omega_m|)$ | for $\theta_e \in [0, \pi/3]$ |
| <2+> | $y_b > y_a > y_c$ | $\theta_e = \cos^{-1}(y_a/|\omega_m|)$ | for $\theta_e \in [\pi/3, 2\pi/3]$ |
| <3+> | $y_b > y_c > y_a$ | $\theta_e = (4\pi/3) - \cos^{-1}(y_c/|\omega_m|)$ | for $\theta_e \in [2\pi/3, \pi]$ |
| <4+> | $y_c > y_b > y_a$ | $\theta_e = \cos^{-1}(y_b/|\omega_m|) + (2\pi/3)$ | for $\theta_e \in [\pi, 4\pi/3]$ |
| <5+> | $y_c > y_a > y_b$ | $\theta_e = (2\pi) - \cos^{-1}(y_a/|\omega_m|)$ | for $\theta_e \in [4\pi/3, 5\pi/3]$ |
| <6+> | $y_a > y_c > y_b$ | $\theta_e = (4\pi/3) + \cos^{-1}(y_c/|\omega_m|)$ | for $\theta_e \in [5\pi/3, 2\pi]$ |

From the sequences of ($y_a$, $y_b$, $y_c$) and the computed angles, we can determine the direction of the rotor rotation. For rotation in the positive direction, the rotor will move from region <1>, to region <2> and so on. Otherwise, it moves in the opposite direction.

In practice, motor parameters such as winding resistance R, self-inductance Ls and mutual inductance Lm, and motor constant k could be nonlinear. In this case, they can be expressed as functions of their dependent variables. For example, winding resistance is a function of the temperature and so R can be expressed as R(T) where T is temperature and Ls($i_s$) where $i_s$ is the stator current etc.

Figure 7:
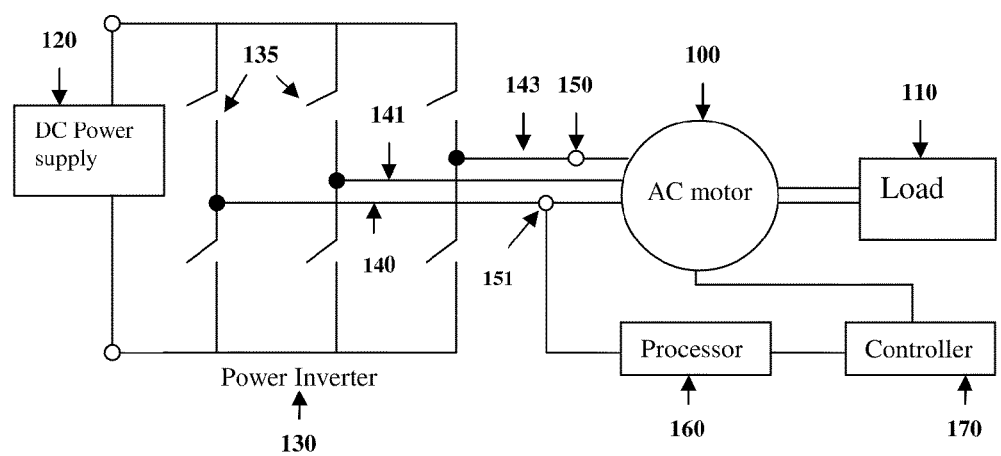
FIG. 7 illustrates an example circuit diagram for an apparatus for controlling a motor and determining the speed, position or direction of rotation of the motor.

FIG. 7 shows an example configuration of a motor and apparatus for controlling the motor and for providing information about the operation of a motor. There is an AC motor 100 configured for driving a load 110. The AC motor is powered by a DC power supply 120 and a PWM power inverter 130. The power inverter has a plurality of switches 135. The power inverter converts the DC current from the power supply into AC current for supplying the motor. The power inverter shown in FIG. 7 is a 3-phase power inverter with two stages. Three different phases are tapped off the inverter by lines 140, 141 and 143 which couple to the motor.

It will be appreciated that different types of inverter could be used, e.g. with more or fewer stages. Furthermore, while current having three phases is preferred, the invention could also be applied to power supplies having a different number of phases.

A plurality of samplers 150, 151 sample the instantaneous current value on at least two of the three phase lines 140, 141, 143 leading to the motor. The current is measured using any known means, for example a hall effect sensor. The instantaneous current information is provided to a processor 160. The processor calculates the instantaneous current of the third phase based on the instantaneous current of the other phases. If the motor windings are star-connected, the processor calculates the instantaneous current of the third phase based on the presumption that the sum of the instantaneous currents of each phase should be approximately zero. The processor 160 determines the rate of change of instantaneous current for each phase (first phase, second phase, third phase). Both the instantaneous current values and the rates of change for each phase are calculated based on raw unfiltered measurements of the current. Or alternatively, the instantaneous current values may be filtered in such a way that the information from current ripples due to inverter switching is maintained. That is the filter only removes noise spikes or background noise and does not remove or smooth out current values which are above or below the 'ideal' current waveform, due to switching effects. In this way important information is retained and used by the processer in its calculation of the rate of change of instantaneous current, back emfs, motor speed, position, direction of rotation etc. A digital filter may be used for this purpose. However, it is not simply a low pass filter which removes all harmonics above a certain frequency, including ripples due to switching. On the contrary, current ripples due to switching are retained and passed through the filter.

The processor 160 uses the rate of change for each phase to calculate or predict the speed of rotation, position and/or direction of rotation of the rotor. A controller 170 is coupled to the motor, DC power supply and the power inverter. The controller 170 controls the motor and the supply of electricity to the motor based on the speed of rotation, position and/or direction of rotation of the rotor calculated by the processor. While the samplers 150, 151, processor 160 and controller 170 have been shown as separate elements in FIG. 7, two or all of them may optionally be combined as a single module. For example, a single processing device may be able to perform the functions of the processor and controller. The sampler, processor and controller may use digital or analog technology.

Figure 8:
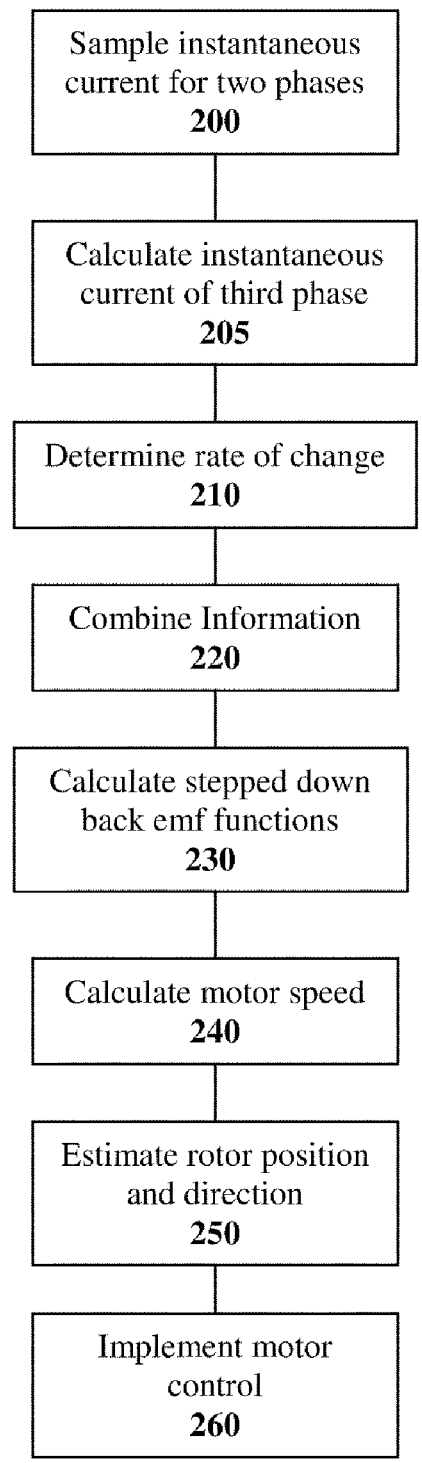
FIG. 8 is a flow diagram showing operation of the apparatus of FIG. 7.

The operation of the apparatus is shown in FIG. 8. In step 200 the samplers 150, 151 sample the instantaneous motor current for two phases. Preferably a plurality of samples is taken for each phase, the sample frequency being higher than the switching frequency of the power inverter 130. In step 205 the processor calculates the instantaneous current of the third phase based on the measurements of current for the first two phases. In step 210 the rate of change of the instantaneous current in each phase is determined from the current samples taken in step 200. In step 220 the information from the different phases is optionally checked for errors. For example, if the instantaneous current or rate of change for one phase is significantly different than expected (e.g. due to a noise spike) the data set for that time period may be discarded. In step 230 stepped down back emf functions are calculated for each phase. In step 240 the speed of the motor is calculated based on the stepped down back emf functions. In step 250 the position of the rotor may be estimated and/or the direction of rotation of the motor may be determined. In step 260 the motor is controlled based on the information provided in steps 240 and/or 250. For example, the motor may be controlled to run at a predetermined speed. If, in step 240, it is determined that the motor is currently operating at a slower speed than the predetermined speed, then its speed may be increased (e.g. by increasing the driving current through PWM or otherwise). If, in step 240, it is determined that the motor is running too quickly, then it may be slowed down in step 260.

Preferred embodiments of the present invention have been described above by way of example only. However, as will be apparent to a person skilled in the art, it is possible make variations, alterations or additions to the above without departing from the spirit or scope of the invention as defined by the appended claims.

The invention claimed is:

1. Apparatus for providing information relating to the operation of an electrical motor; comprising a sampler for sampling an instantaneous motor current $i_s$ and a processor for determining an instantaneous rate of change of the motor current and providing information about the motion or position of said motor based on said instantaneous rate of change of the motor current, wherein the sampler has a sampling rate, said sampling rate having a frequency greater than or equal to a switching frequency of an inverter arranged to drive the motor.

2. The apparatus of claim 1 wherein said motion or position information is one or more of motor speed, rotor position or direction of rotation.

3. The apparatus of claim 1 wherein said inverter is capable of switching between a plurality of switching states.

4. The apparatus of claim 3 wherein the inverter is arranged to produce a motor current, approximating an ideal waveform, said motor current having peaks and troughs, above and below said ideal waveform, caused by switching of the inverter.

5. The apparatus of claim 3 wherein the apparatus is arranged so that said processor determines the instantaneous rate of change of the motor current based on instantaneous motor current samples which are not filtered, or which are filtered by a filter which retains peaks and troughs caused by switching of the inverter.

6. The apparatus of claim 3 wherein the processor provides said information based on the instantaneous rate of change of the motor current and the known voltage in each inverter switching state.

7. The apparatus of claim 3 wherein the inverter is a PWM inverter for producing a PWM current for driving the motor.

8. The apparatus of claim 1 wherein there are a plurality of samplers arranged for sampling the instantaneous motor current in at least two phases and the processor calculates the motor position or motion information based on measurements of the instantaneous current in said at least two phases.

9. The apparatus of claim 8 wherein the processor is arranged to calculate the motor speed for a plurality of current phases and estimate the actual motor speed based on the average of the motor speeds for each phase.

10. The apparatus of claim 8 wherein the processor is arranged to calculate stepped down versions of the back electromotive forces for each phase and to estimate the position or direction or rotation of the rotor by comparing said stepped down versions of the back electromotive forces.

11. The apparatus of claim 1 wherein the processor is arranged to calculate the position or motion information based on an artificial motor constant which is lower than the actual motor constant of the motor.

12. A method of determining information relating to operation of a motor comprising the steps of
    a) sampling a plurality of instantaneous motor current values;
    b) determining an instantaneous rate of change of the motor current based on said current values;
    c) calculating information about motion or position of said motor based on said instantaneous rate of change of the motor current,
    d) switching an inverter between a plurality of switching states to provide current to the motor and sampling the instantaneous motor current at a frequency equal to or greater than the frequency at which the inverter switches between switching states.

13. The method of claim 12 said step of sampling comprises taking a plurality of samples of actual motor current above or below an ideal waveform for the motor current.

14. The method of claim 12 wherein said information is calculated based on said instantaneous rate of change of the motor current and the known voltage in each inverter switching state.

15. The method of claim 12 wherein the motor speed is calculated for a plurality of current phases and the actual motor speed estimated based on the average of the motor speeds for each phase.

16. The method of claim 12 wherein instantaneous current values are sampled for a plurality of phases and wherein said instantaneous current values, or other values based on the instantaneous current values, are checked against each other for accuracy.

17. The method of claim 12 wherein instantaneous current values are sampled for a plurality of phases and comprising the steps of calculating stepped down versions of the back electromotive forces for each phase and estimating the position or direction of rotation of the rotor by comparing said stepped down versions of the back electromotive forces.

18. A method of controlling a motor based on information relating to the position or motion of the motor, comprising the steps of determining position or motion information of the motor in accordance with claim 12, and controlling the motor based on said information.

* * * * *